United States Patent
Jew et al.

(10) Patent No.: US 11,652,955 B1
(45) Date of Patent: May 16, 2023

(54) SIGNATURE MITIGATION FOR UNCOOLED THERMAL SYSTEMS

(71) Applicant: BAE Systems Information and Electronic Systems Integration Inc., Nashua, NH (US)

(72) Inventors: Jeffrey L. Jew, Brookline, NH (US); Michael A. Costolo, Amherst, NH (US); Adam O. Powers, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 242 days.

(21) Appl. No.: 17/217,227

(22) Filed: Mar. 30, 2021

(51) Int. Cl.
*H04N 5/33* (2023.01)
*H04N 5/06* (2006.01)

(52) U.S. Cl.
CPC ............. *H04N 5/33* (2013.01); *H04N 5/06* (2013.01)

(58) Field of Classification Search
CPC .................................... H04N 5/33; H04N 5/06
See application file for complete search history.

(56) References Cited

U.S. PATENT DOCUMENTS

| 9,948,880 B2 | 4/2018 | Lund et al. |
| 2017/0064224 A1* | 3/2017 | Yoo .......................... G01J 1/46 |

* cited by examiner

*Primary Examiner* — Kathleen V Nguyen
(74) *Attorney, Agent, or Firm* — Sand, Sebolt & Wernow LPA

(57) ABSTRACT

Techniques for reducing a likelihood of detection of an imaging system by another imaging system are provided. For example, the techniques may include controlling read-out such that the timings between frames of an image are non-uniform. For example, a processor may be configured to generate a plurality of frame synchronization signals from a main clock and transmit the plurality of frame synchronization signals to readout circuitry. Each frame synchronization signal is an instruction to start the biasing and reading for a respective frame. The plurality of frame synchronization signals may be generated such that a timing between pulse biasing the same thermal sensor is not uniform. The techniques may also include controlling the read-out such that the timings between lines within a frame are non-uniform which also results in the timing between pulse biasing of the same thermal sensor not being uniform.

19 Claims, 8 Drawing Sheets

Offset Current Look Up Table 600

| Pixel | Offsets Currents | | |
| --- | --- | --- | --- |
| | Time 1 | Time 2 | Time N |
| [1,1] | O1 | O2 | O3 |
| [1,2] | O4 | O5 | O6 |
| [1,3] | O7 | O8 | O9 |
| ... | | | |
| [N,M] | O10 | O11 | O12 |

Fig. 6

SIGNATURE MITIGATION FOR UNCOOLED THERMAL SYSTEMS

FIELD OF THE DISCLOSURE

This disclosure relates to imaging systems. This disclosure also relates to techniques to reduce a likelihood of detection of the imaging system by another imaging system.

BACKGROUND

Typical imagers are constructed from an array of sensors, such as microbolometers. An optical system focuses incident light in an image on the array. The microbolometers are designed to be highly absorptive in the spectral band of interest. As the microbolometers absorb the optical energy their temperature rises. This temperature is measured by the bolometric effect, wherein the resistance of the microbolometer is a function of its temperature. The most common bolometric material is vanadium oxide which has high bolometric coefficients (delta-R/delta-T) but a low device resistance. To compensate for this low resistance, arrays use a "pulse bias" readout where the microbolometer is allowed to thermally equilibrate over several milliseconds and the resistance is read using a voltage or current pulse. System performance of these pulse biased microbolometers is optimized through efficient and well-focused optics, highly absorptive material, and thermally-isolated detectors.

However, these types of imagers may be detected by another imager, e.g., another imaging system. For example, U.S. application Ser. No. 16/987,879 describes a detector and an imaging system for detecting microbolometers.

SUMMARY

Accordingly, disclosed are techniques for reducing a likelihood of detection of an imaging system by another imaging system.

For example, in aspects of the disclosure, the timing between frames of an image is non-uniform.

In an aspect of the disclosure, a system may comprise an oscillator configured to generate a main clock, and a focal-plane array (FPA) and a processor. The FPA may comprise a two-dimensional configuration of thermal sensors arranged in rows and columns and readout circuitry to pulse bias one or more thermal sensors of one or more of the rows and obtain output from the pulse biased thermal sensors. The processor may be configured to generate a plurality of frame synchronization signals from the main clock and transmit the plurality of frame synchronization signals to the readout circuitry. Each frame synchronization signal is an instruction to start the biasing and reading for a respective frame. The plurality of frame synchronization signals may be generated such that the timing between pulse biasing the same thermal sensor is not uniform.

The timing between frames may be set based on a target frequency spread which is determined based on an application for the system.

In an aspect of the disclosure, the timing between frames is set such that the system cannot be detected by another system within a second distance, which is a percentage less than a first distance. The first distance may be the distance in which the system has an imaging range.

In an aspect of the disclosure, the frames may comprise at least a first frame, a second frame and a third frame. The timing between the first frame and the second frame may be different from the timing between the second frame and the third frame.

In an aspect of the disclosure, the system may further comprise a memory storing a table of delay values. The delay values may be integer multiplies of the main clock. The processor may be configured to generate the plurality of frame synchronization signals based on the table of delay values.

In other aspects of the disclosure, the plurality of frame synchronization signals may be based on bounded pseudo random values.

In other aspects of the disclosure, the processor may be configured to generate the plurality of frame synchronization signals based on the table of delay values and scaled with bounded pseudo random values.

In an aspect of the disclosure, the memory may store a table of offset currents for each row based on a timing between frames. In accordance with this aspect, the processor may be configured to determine the offset currents for rows in the frame based on the timing between frames and transmit the determined offset currents to the readout circuitry.

In other aspects of the disclosure, in response to the reception of image data from the readout circuitry, the processor may be configured to adjust the image data for display based on the timing between frames.

In an aspect of the disclosure, the timing between lines of a frame of an image may be non-uniform in addition to the timing between frames. For example, in an aspect of the disclosure, the processor may be configured to generate a plurality of line synchronization signals from the main clock and transmit the plurality of line synchronization signals to the readout circuitry. Each line synchronization signal is an instruction to start the biasing and reading for a respective line. The plurality of line synchronization signals may be generated such that a timing between pulse biasing the same thermal sensor is not uniform.

In an aspect of the disclosure, the lines may comprise at least a first line, a second line and a third line. The timing between the first line and the second line may be different from the timing between the second line and the third line.

In an aspect of the disclosure, the memory may store a table of delay values. The delay values may be integer multiplies of the main clock. In this aspect, the processor may be configured to generate the plurality of line synchronization signals based on the table of delay values.

In other aspects of the disclosure, the plurality of line synchronization signals may be based on bounded pseudo random values.

In other aspects of the disclosure, the processor may be configured to generate the plurality of line synchronization signals based on the table of delay values and scaled with bounded pseudo random values.

In an aspect of the disclosure, the memory may store a table of offset currents for each row based on a timing between frames and rows. In this aspect, the processor may be configured to determine the offset currents for rows in the frame based on the timing between frames and rows and transmit the determined offset currents to the readout circuitry.

In an aspect of the disclosure, the timing between lines of a frame of an image may be non-uniform. In an aspect of the disclosure, a system may comprise an oscillator configured to generate a main clock, and a focal-plane array (FPA) and a processor. The FPA may comprise a two-dimensional configuration of thermal sensors arranged in rows and columns and readout circuitry to pulse bias one or more thermal sensors of one of the rows and obtain output from the sensors. The processor may be configured to generate a plurality of line synchronization signals from the main clock and transmit the plurality of line synchronization signals to the readout circuitry. Each line synchronization signal is an instruction to start the biasing and reading for a respective line. The plurality of line synchronization signals may be generated such that a timing between pulse biasing the same thermal sensor is not uniform.

In other aspects of the disclosure, also disclosed is a method comprising determining a non-uniform timing sequence between a plurality of frames of an image such that pulse biasing of a same thermal sensor of a two-dimensional configuration of thermal sensors arranged in rows and columns is not uniform and transmitting a plurality of frame synchronization signals to readout circuitry. The readout circuitry is configured to pulse bias one or more thermal sensors of one or more of the rows and obtain output from the pulsed biased thermal sensors. Each frame synchronization signal is an instruction to start the biasing and reading for a respective frame.

The method may also comprise determining the offset currents for the pulse biased thermal sensors based on the non-uniform timing sequence and transmitting the offset currents for the pulse biased thermal sensors to the readout circuitry.

The method may also comprise receiving intensity data corresponding to the pulsed biased thermal sensors and correcting the received intensity data using coefficients determined based on the non-uniform timing sequence.

BRIEF DESCRIPTION OF THE DRAWINGS

FIG. 6 depicts an example of a look up table for offset currents in accordance with aspects of the disclosure;

DETAILED DESCRIPTION

Figure 1:
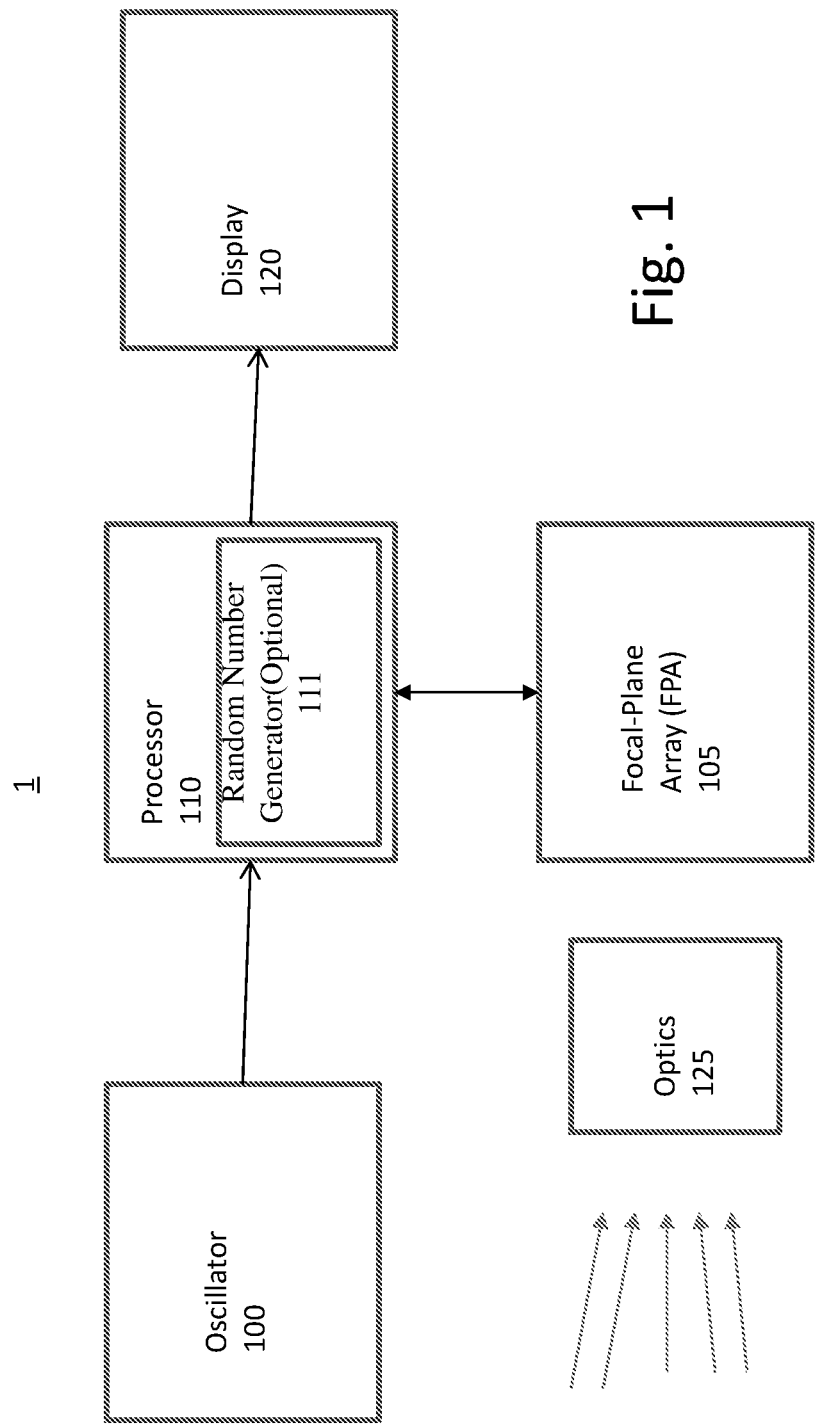
FIG. 1 depicts an system in accordance with an aspect of the disclosure.

FIG. 1 depicts an imaging system 1 in accordance with aspects of the disclosure. The image system 1 senses radiation such as infrared radiation to generate a thermal image.

The imaging system 1 may comprise an oscillator 100. The oscillator 100 may be a crystal oscillator. A crystal oscillator resonates and is capable of producing a precise frequency for use as a precision main clock for the imaging system 1. This main clock is the source of other clock(s) and synchronization signal(s)/command(s) used in the imaging system 1.

The imaging system 1 may also include a processor 110. The processor 110 may be a FPGA. In other aspects of the disclosure, the processor 110 may be a microcontroller or microprocessor or any other processing hardware such as a CPU or GPU. In an aspect of the disclosure, the processor 110 may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The main clock of the oscillator 100 is fed to the processor 110. Using the main clock, the processor 110 generates other clock(s) and command(s) used by the system 1. The command(s) and clock(s) are sent to a focal-plane array (FPA) 105.

Figure 2:
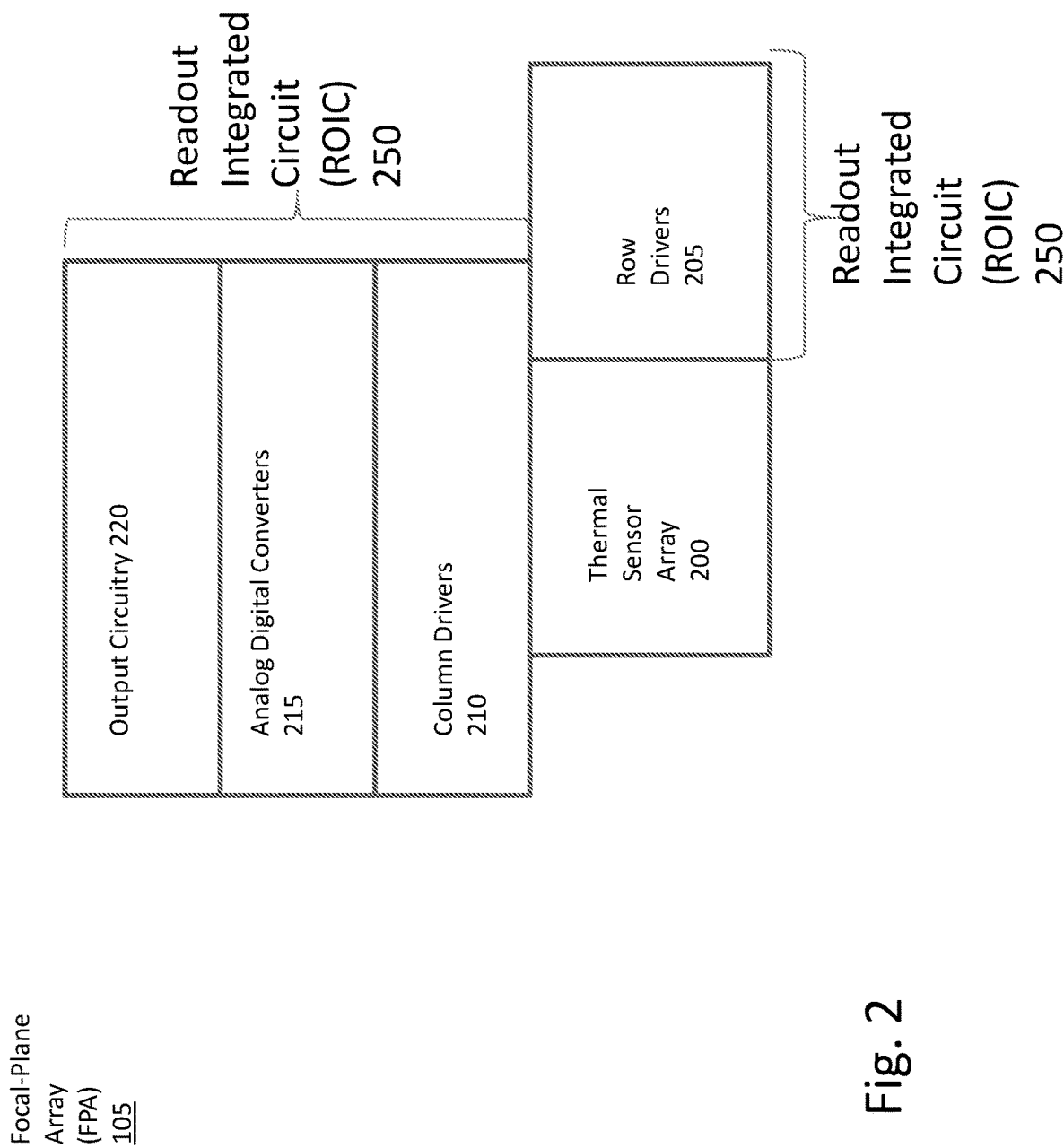
FIG. 2 depicts a focal-plane array in accordance with aspects of the disclosure.

Certain components of the FPA 105 are shown in FIG. 2 (as blocks). The FPA 105 may comprise a readout integrated circuit (ROIC) 250 and a thermal sensor array 200. The thermal sensor array 200 may be responsive to IR radiation. For example, the thermal sensor array 200 may be responsive to mid-wavelength IR. In other aspects, the thermal sensor array 200 may be responsive to long-wavelength IR. In other aspects, the thermal sensor array 200 may be responsive to both mid-wavelength IR and long-wavelength IR. For example, the thermal sensor array 200 may be responsive to wavelengths between 3 μm to 15 μm. In other aspects, the thermal sensor array 200 may be responsive to wavelengths between 6 μm-15 μm. In other aspects, the thermal sensor array 200 may be responsive to wavelengths between 8 μm-12 μm. In other aspects, the thermal sensor array 200 may be responsive to wavelengths between 3 μm-8 μm.

The imaging system 1 may comprise optics 125. The optics collect and focus light from the scene as an image on the thermal sensor array. The optics 125 may include one or more lenses. For example, the lenses may include a focus lens and a relay lens. The lenses may be mounted to a housing (not shown). The housing may have an opening, such as a slit, to allow infrared radiation into the imaging system 1. In some aspects, the opening may be covered. The cover may be transmissive for the IR.

The lenses may be a plano-convex lens. The lens may be Zinc Selenide ZnSe. A ZnSe lens is designed for the infrared spectrum. However, in other aspects, other materials may be used.

In some aspects, the lenses may be coated to improve transmission efficiency for a specific range of wavelengths. For example, a broadband anti-reflection (BBAR) coating may be used. The coating may be set for a desired wavelength range.

The size of the lens, number of lens and focal length, may be defined based on a desired size for the imaging system 1. Smaller lens and focal lengths may be used where the system 1 is desired to be small and portable. Larger lens and focal lengths may be used where the system 1 is fixed, such as mounted to a vehicle, such as an airplane, helicopter, boat, truck, bus, motorcycle, submarine, UAV, etc.

The thermal sensor array 200 may have a plurality of thermal sensors. The sensors are generally arranged in rows and columns. The number of rows and columns may be based on the application for the imaging system 1 and the size of the array 200. In some aspects, the thermal sensor array 200 may be used for a video graphics array (VGA) and have 480 rows and 640 columns. In other aspects of the disclosure, the thermal sensor array 200 may have different resolution. For example, the thermal sensor array 200 may be 160 columns and 120 rows, 320 columns and 240 rows, 1024 columns and 768 rows or 1920 columns and 1200 rows. However, the number of columns and rows are not limited to the above examples and there is no required minimum size or maximum size of the thermal sensor array 200, subject to the design and operation.

In an aspect of the disclosure, each thermal sensor may be formed from IR sensitive material such as vanadium oxide or metal-doped vanadium oxide to detect the incoming IR radiation which is focused on the thermal sensor array 200 (by the optics 125). This material may cover some or most of an exposed surface of a respective pixel. The IR sensitive material, such as vanadium oxide is a conductive material that heats when exposed to IR radiation. This heating causes the resistance of the material to lower due to the thermal coefficient of resistance (TCR). For example, the TCR of vanadium oxide can be around 2%/C. In some embodiments, the TCR of vanadium oxide can be improved through techniques such as metal doping.

The ROIC 250 in certain embodiments comprise row drivers 205 and columns drivers 210. The TCR causes the measured resistance in the sensor to decrease as the sensor heats up (e.g., through absorbing IR radiation). This decrease in resistance can be measured, for example, using row drivers 205 and column drivers 210 to measure the increased current passing through the decreased resistance. Since the current is inversely proportional to the resistance, the measured current provides a way to measure the resistance, and thus the temperature change, in the thermal sensor. From this, the portion of the temperature change due to IR flux can be determined and thus, a value or values representing the IR radiation measured by the thermal sensor can be determined. The process can be repeated across the array 200 until every thermal sensor is measured.

In an aspect of the disclosure, the thermal sensor array 200 may be physically and electrically connected to the ROIC 250, such as through a set of row lines and column lines in the ROIC 250 underneath the thermal sensor array 200. The row drivers 205 may be coupled to the row lines, which in turn may be coupled to the rows of the array 200, respectively, and column drivers 210 may be coupled to the column lines and which in turn may be coupled to the columns of the array 200, respectively.

The FPA 105 may take IR images in frames (e.g., each frame representing one measurement per pixel or thermal sensor). Each frame constitutes a single instance of the two-dimensional data. Data may be organized by lines which represent a single row or column of data. Data may be sampled in one or more subsets or clusters of the full frame. Data is sampled by pulse biasing the respective thermal sensors and computing the corresponding incident IR radiation. The pixels in a cluster may be pulse biased and read by rows. One or more contiguous or non-contiguous pixels in a row may be sampled simultaneously. One or more contiguous or non-contiguous set of rows may be sampled simultaneously.

Sampling each sensor with a pulse bias causes a rise and fall in the temperature of the corresponding thermal sensor at the pulse bias frequency. The IR emission of the thermal sensor changes with the sensor temperature via Planck's law of blackbody radiation. This change in emission is synchronous with the pulse biasing and thus the data read rate.

The rows of the thermal sensor array 200 are electrically connected to the row drivers 205 through row lines, such as one row driver and row line per row of pixels. Each row driver is configured to bias (pulse bias) one or more thermal sensors in its corresponding row. Biasing transmits a biasing current through a set of electrodes, such as a common low voltage source coupled to one side (e.g., one electrode) of each thermal sensor. In addition, the columns of the thermal sensor array 200 are electrically connected to the column drivers 210, such as one column driver per column of pixels per row being concurrently or simultaneously biased.

The rows may be sequentially biased. In an aspect of the disclosure, the sequence may be in the same physical order as in the array. For example, row 1, row 2, row 3, etc. . . . , may be biased in that order. However, in other aspects, the order may be different from the same physical order. In an aspect of the disclosure, the order may change in different frames.

The column drivers 210 are configured to measure the thermal sensors such as by integrating and measuring the current from a separate high voltage source coupled to the other side of each thermal sensor. For example, each column driver can be coupled to one of the thermal sensors being biased, and measures the current transmitted through the thermal sensor during the biasing (or integration) period or cycle. The measured current represents an analog IR signal.

The timing in which the ROIC 250 begins the pulse biasing for a frame is determined by a frame synchronization command received from the processor 110. Additionally, the row and timing that a specific row is pulse biased is also determined by a line synchronization command received from the processor 110. In a known system, the timing between the frames is consistent. For example, once the final row for a frame is pulse biased, a first row of the next frame is pulse biased in a consistent manner. Additionally, in a known system, the timing between pulse biases of rows within a frame is also constant. However, the pulse biasing itself may produce a detectable signature, e.g., thermal energy, by another thermal imaging system, by having uniform frames and or lines, a fixed and repeatable detectable signature may be detected by another thermal imaging system.

In accordance with aspects of the disclosure, the timing between frames may be different. The timing difference makes it more difficult for another thermal imaging system to detect the imaging system 1. This is because an signature, e.g., thermal energy, emitted as a result of the pulse biasing will no longer be uniform and by introducing a delay between frames (non-uniform delay), the signature is spread over frequency. The non-uniformity and increase in signature makes any signature being emitted look like noises as opposed to from the imaging system 1. The non-uniformity also increases the signature bandwidth which limits the available signal processing gain for another imaging system.

For example, a known method for systems, which are used for thermal detection, to improve SNR for narrow frequency signals is correlating a series of measurements and computing the Fourier transform of the series. The noise in the series is proportional to the square-root of the number of samples and the signal energy is linearly proportional to the number of samples. Thus, the SNR scales as the square root of the number of sample points.

Figure 7B:
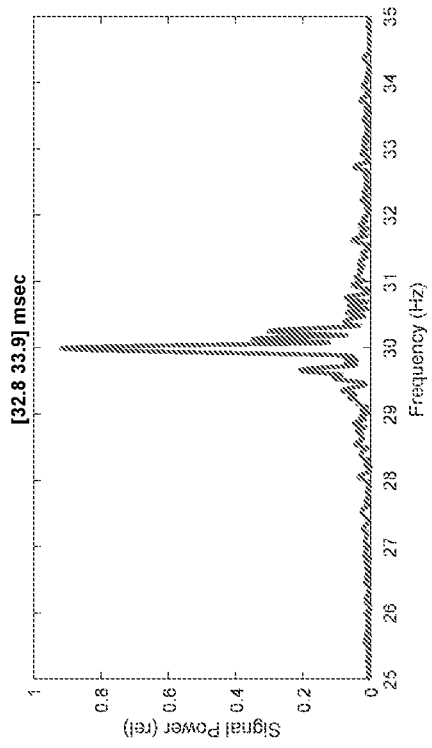
FIGS. 7A-7D depicts spectral signal power based on a constant frame rate (FIG. 7A), changing the frame rate+−0.5 Hz (FIG. 7B), changing the frame rate+−1 Hz (FIG. 7C) and changing the frame rate+−2 Hz*FIG. 7D.
Figure 7D:
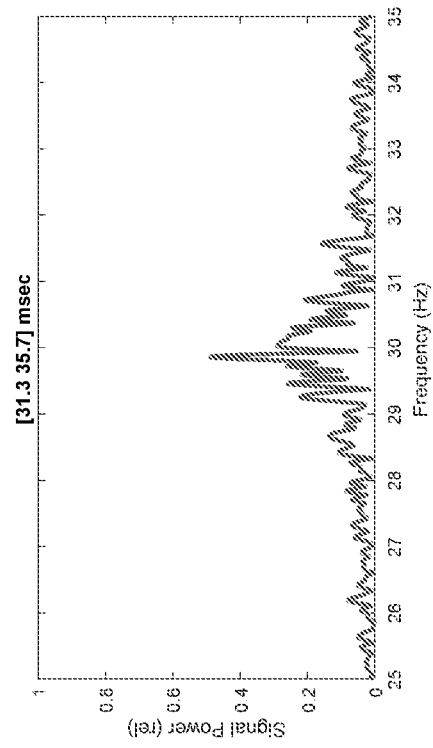
Figure 7A:
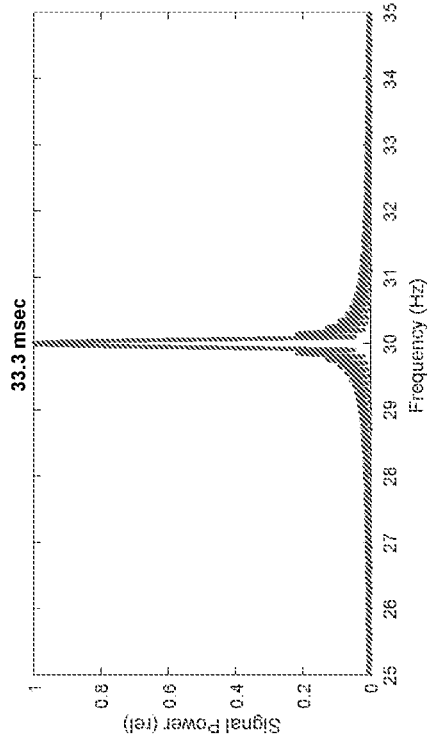
Figure 7C:
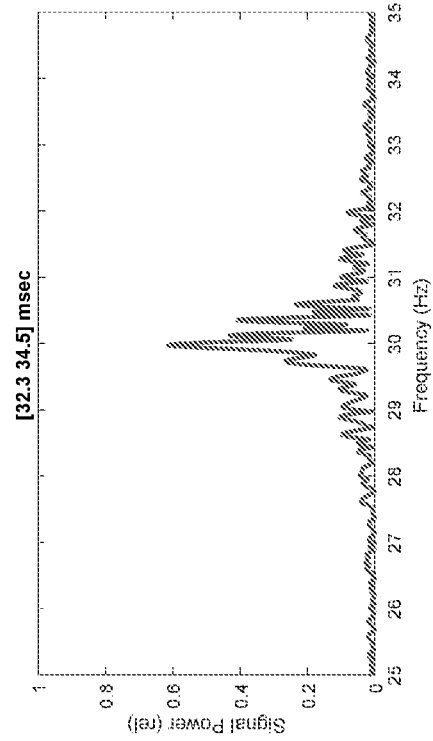

Additionally, the frequency resolution of the Fourier transform is inversely proportional to the sample time; e.g. a 0.1 second series has Fourier resolution of 10 Hz, a 1.0 second series has resolution of 1 Hz, a 10 second series has resolution of 0.1 Hz, etc. Detection of signal energy is simplest (i.e. SNR is maximized) when the energy is concentrated in a single frequency element of the Fourier transform. Occupying a single frequency element requires a signal bandwidth of less than the resolution of Fourier transform. Signals with bandwidth wider than a single element spread the signal energy across multiple elements. Detection is hardest (i.e. SNR is minimized) when the signal is spread across the maximum number of frequency elements. Aspects of the disclosure exploit this by spreading the signature over frequency such that the energy is not concentrated in a single frequency element. The number and range of the non-uniform timings is selected in accordance with the desired frequency spreading and the maximum integration time desired for an adversarial detection system. For instance, to deny an adversary system an integration time of greater than 1 second the signal frequency is spread by 1 Hz or more. For example a system with a nominal 30 Hz frame has a period of 33.3 msec between successive frames. This may be spread to greater than 1 Hz by varying the period between frames over a range exceeding 32.8 msec-33.9 msec. The degree of spreading required depends on the magnitude of signature reduction desired. FIGS. 7B-7D illustrates the reduction in spectral signal power for random variations of ±0.5, ±1, ±2 Hz which reduce peak emission by 10%, 20%, and 57% respectively compared with the spectral signal power for no variation as shown in FIG. 7A.

The processor 110 may generate the frame synchronization command from the main clock. In an aspect of the disclosure, the processor 110 implements a state machine to generate the frame synchronization command. The frame synchronization command may be an integer multiple of the main clock. In an aspect of the disclosure, the multiple may be randomly determined, using a random number generator 111. The random number may be bounded based on calibration and based on the desired degree of spreading. For example, having a delay between adjacent frames being too long will impact the performance of the imaging system 1 and make the image choppy (larger time difference between successive frame synchronization commands). Therefore, the random number generator may include a maximum. The maximum may be a function of the application and the thermal sensor array 200. For example, for a CCTV security camera or surveillance situation, the frame rate may be 10 Hz, provided that the image does not rapidly change. Also, a frame rate of 27 Hz would not impact the image to a human eye and would not require special compensation, such as for a static sensor. For dynamic sensors, e.g., helmet mounted thermal sensors, the nominal rate is 60 Hz and up. Reducing the frame rate by more than 10% would impact the performance of the imaging system and would have a visible effect. The random number may also have a minimum value. The minimum value may be based on the number of rows and the pixel clock, e.g., to account for the time it takes to read out an entire frame. The minimum value would result in no delay between frames. The maximum and minimum values may also be based on current bias in the memory. The frame rate may be maintained within a range where current bias tables are stored in memory (via calibration) for determined by an equation.

The processor 110, using the random number generator 111, determines the number of main clocks to wait between commands to generate and transmit the frame synchronization command. In other aspects of the disclosure, the processor 110 may receive the image data for a frame (e.g., last row) from the ROIC 250 and subsequently determine the number of main clicks to wait to generate and transmit the frame synchronization command after receipt thereof.

In another aspect of the disclosure, the imaging system 1 may include a look-up table in memory 400. The look-up table may include frame delays 405, e.g., timing between frames. In other aspects of the disclosure, the look-up table may include the number of main clock cycles between frame synchronization commands. In accordance with aspects of the disclosure, the look-up table may be populated during a calibration phase. For example, a known imaging target may be sensed by the system. At the same time, another imaging system may be in line of sight of the FPA 105. The sequence of delays between frames or the timing between frame synchronization commands may be determined such that the other imaging system cannot detect the imaging system 1 at a predetermined range (desired spreading). This predetermined range may be a percentage of the desired imaging range of the system such that the desired imaging range is larger than the predetermined range. For example, in some applications, the percentage may be 80% of the desired imaging range. For example, if the desired imaging range is 1 mile, the predetermined range may be 0.8 mile. However, the percentage may also be based on whether it is expected that other objects may be between the system 1 and a detection target. For example, when there are one or more expected objects, the percentage may be 30% of the desired imaging range because there is more likely to be another imaging system closer if another object is between the system 1 and the detection target. The percentages are not limited to the examples provided herein and the examples are only for descriptive purposes.

The processor 110, using the look-up table stored in memory 400, may determine the number of main clocks to wait between commands to generate and transmit the frame synchronization command. In other aspects of the disclosure, the processor 110 may receive the image data for a frame (e.g., last row) from the ROIC 250 and subsequently determine the number of main clocks to wait to generate and transmit the frame synchronization command after receipt thereof (using the look-up table). In another aspect of the disclosure, the processor 110 may determine the timing based on both a random number generator (bounded as described above) and a look-up table. The look-up table may having a plurality of preset values for the number of main clocks, e.g., either number of main clocks between commands or clocks between frames, e.g., end of previous frame and start of next frame. In order to generate and transmit a frame synchronization command, the processor 110 (via the random number generator) may obtain a random number and also obtain a preset value and multiple the preset value by the obtained random number. In other aspects, the random number may be used for selection of a specific value in the look-up table, e.g., line item in the table. This may eliminate a need to have a fully pre-defined look-up table with little or no randomness, which has an outer time-scale under which it begins to repeat again. This repetition may form another signature peak at a nominal location of F_frame/N for N elements in the table. In practice, this new signature can be arbitrarily low for an arbitrary length table and can be located in a portion of the spectrum where the background has a lot of power. For arbitrarily large integrations, this also results in repeatable side-lobes of the fundamental that could be used for detection or identification. A randomly accessed table avoids the appearance of the new signature elements without the need for arbitrarily long look up tables. This value may be used to determine the number of main clocks to wait either between commands or main clocks between frames, e.g., after receipt of image data of last row of previous frame.

Figure 5A:
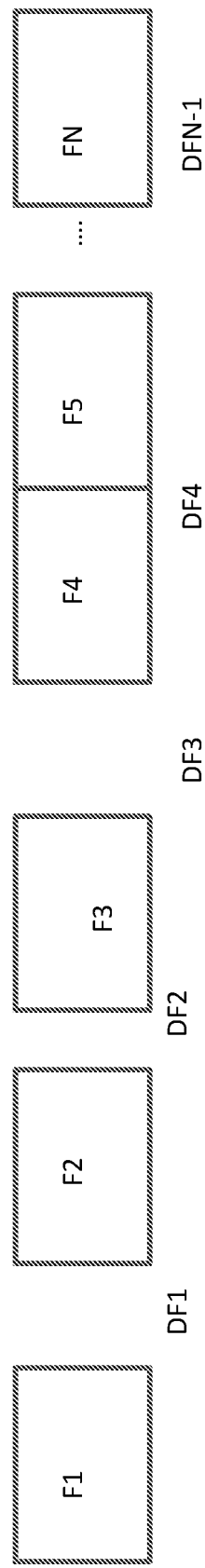
FIG. 5A depicts an example of timing between frames in accordance with aspects of the disclosure.

FIG. 5A depicts an example, of the non-uniformity between frames. DF1 represents the timing between the first image frame and the second image frame; DF2 represents the timing between the second image frame and the third image frame; DFN-1 represents the timing between the Nth-1 frame and the Nth frame. As shown, the timing between the first/second image frames and second/third image frames are different. In an aspect of the disclosure, the timing between each frame may be different. However, in other aspects, the timing between some of the frames may be the same. For example, in some aspects of the disclosure, the timing between some of the frames may be zero, e.g., no delay. In other aspects, the timing between every Nth frame may be different. For example, the timing between the first through tenth frames may be the same, e.g., no delay, the timing between the tenth and the eleventh frame being delayed with respect to the others, and the timing between the eleventh and the twentieth frames may be the same, . . . . The above timings are just an example for descriptive purposes and other timings may be used.

The processor 110 also generates the line synchronization command and pixel clock from the main clock. In an aspect of the disclosure, the timing between lines, e.g., timing between line synchronization commands may be the same, e.g., the same multiple of the main clock (or delays).

Figure 3:
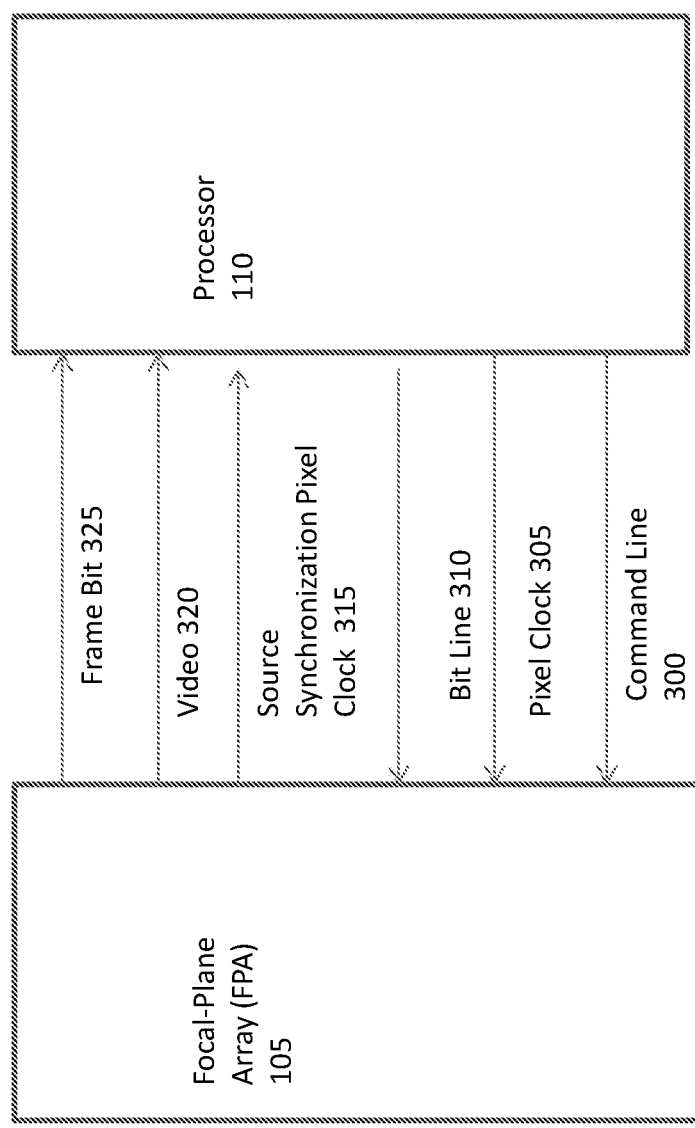
FIG. 3 depicts communication lines between the FPA and a processor in accordance with aspects of the disclosure.
Figure 4A:
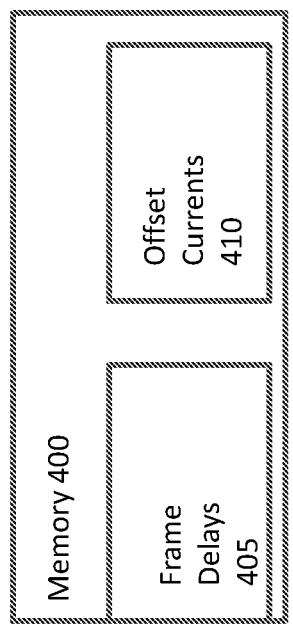
FIG. 4A depicts a memory in accordance with aspects of the disclosure.
Figure 4B:
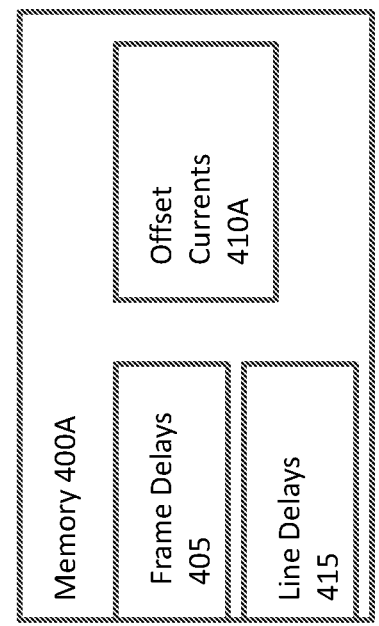
FIG. 4B depicts a memory in accordance with other aspects of the disclosure.

FIG. 3 depicts the communication lines (bus) between the FPA 105 and the processor 110. The frame synchronization commands and line synchronization commands are transmitted from the processor 110 to the FPA 105 via the command lines 300. The pixel clock is transmitted from the processor 110 to the FPA 105 via the pixel clock line 305. Data associated with a command is transmitted from the processor 110 to the FPA 105 via a bit line 310. For example, the specific row that the line synchronization command is for is transmitted via the bit line 310. Further, offset currents for each pixel within a row may be transmitted via the bit line 310 (associated with an offset current command).

The FPA 105 transmits to the processor 110 a source synchronization clock via line 315. The source synchronization clock is the same as the pixel clock received from the processor 110. The source synchronization clock is used by the processor 110 to confirm the pixel data. For example, there may be a delay associated with routing the clock throughout the system which may vary based on operating voltage, timing frequency, or specific unit number. To account for this delay the source synchronization clock is fed back with the data to avoid issues with data setup and hold. This prevents the processor 110 from sampling the data before the digital signals are stable. The image data, per row, is transmitted from the FPA 105 to the processor 110, for further processing, via the video line 320. Additionally, the FPA 105 transmits to the processor 110 a frame bit via line 325. The frame bit includes which row the image data is for such that the processor 110 can reconstruct the image for the frame.

The pulse biasing may introduce inaccuracies into the measured IR signal currents because the biasing itself may heat the IR sensors, which may cause change in the resistances that is not due to the incoming IR flux being measured. This heating, when measuring the IR sensor, may be the dominant portion of the increased heat which might cause a false detection.

Further, there may be other source of inaccuracies. For example, another source of inaccuracies may be the absolute readings of the IR sensors, which can vary dramatically from sensor to sensor due to factors such as normal fabrication variance (which increases significantly with smaller and thinner sensor design). To address inaccuracies such as these, offset currents can be generated for each IR sensor. These offset currents are subtracted from the pulse bias current in the Analog to Digital Conversion process to correct repeatable noise sources in each pixel. Additionally, these inaccuracies may be impacted by different timing between frames and/or between lines and different offset currents may be required to address different frame timings.

Therefore, in accordance with aspects of the disclosure, the thermal sensor array 200 may be calibrated in advance using a preset target pattern having a known or fixed IR signature and using various different timings between frames. For example, when a look-up table is used for the timing, the calibration may include determining the offset currents for each timing included in the look-up table (e.g., populate the look-up table). The offset current may be determined per pixel (e.g., array element). In other aspects, when a random number generated is used for the timing, the calibration may be used to determine the bounds, e.g., minimum and maximum. When a combination of both is used, the calibration may be used to determine the preset offset currents, which will be subsequently scaled.

From this calibration, corresponding offset currents can be determined that can be used to cancel the effects such as the DC component (e.g., normal current experienced at beginning of biasing an unheated IR sensor), bias heating, and the variance between pixels during the pulse biasing, signal integration cycle and different timing. Once determined, the offset currents 410 (for the various timings) can be stored in a memory 400 (and associated with a specific timing between frames).

In accordance with aspects of the disclosure, when the processor 110 determines the timing for the frame synchronization command(s) in a manner as described above, the processor 110 obtains the offset currents associated with the timing from a table of offset currents 410. The processor 110 transmits the frame synchronization command, the line synchronization command and offset command, respectively via 300, 305 and the specific row and offset currents via the bit line 310.

In other aspects of the disclosure, the offset currents may be determined in advance for a single timing between frames and stored in memory 400 (as offset currents 410). The processor 110 in response to receiving the image data for the frame may adjust the image data based on the timing of the frame synchronization command(s). When the pulse bias frequencies are varied there will be slightly different residual heat loads from the previous pulse bias depending on the timing between pulses. To counteract the difference, a scaling factor or adjustment may be applied to the stored offset currents based on the relative timing. For example, a single scaling fact may be used for the entire frame. Factors less than 1 would correspond to faster frame rates (more residual bias heating) and factors greater than one for slower frame rates (less residual heating). The offset currents would be subtracted from the image frame for frames faster than the single timing and added for frames slower than the single timing. The offset currents, received from the processor 110 may be subtracted (added) from the actual sensed currents during biasing of the thermal sensors by the current drivers 210, and the resulting difference currents may be amplified through a preamplifier (e.g., through corresponding current amplifiers) and integrated to produce the analog voltage signals corresponding to the IR flux sensed by the pixels.

The analog signals corresponding to the IR flux sensed by the pixels are converted by analog-to-digital converters (ADC) 215 of the ROIC 250 into digital image signals. In an aspect of the disclosure, the number of ADCs 215 is the same as the number of columns in the thermal sensor array 200.

The ROIC 250 may comprise output circuitry 220. The output circuitry 220 may include a multiplexor to combine the digital image signals for a row for output (to the processor 110).

The ROIC 250 may determine the timing for each processing event based on the received pixel clock and frame synchronization command(s) and line synchronization command(s). For example, different processes may occur in different pixel clock cycles. For example, generating the offset currents (from the offset current values received from the processor 110), biasing (and measuring) the IR sensors, offsetting (or normalizing) the measured currents with the offset currents, and integrating the normalized currents may occur in a pixel clock cycle, converting the integrated (analog) signals from the biased sensors to corresponding digital signals in the next pixel clock cycle, and outputting the digital signals in the next pixel clock cycle.

In an aspect of the disclosure, once the processor 110 receives the image data (digital signals) for all the rows in a frame, the processor 110 generates an image of the frame for display on a display 120. The processor 110 knows that the image data is for a last row of a frame based on the frame bit 325 received from the FPA 105.

In an aspect of the disclosure, in addition to the timing between frames being non-uniform, the timing between readout of the lines may be non-uniform (e.g., timing between lines). The timing of the line synchronization command may be determined in a similar manner as described above for the frame synchronization command. For example, the processor 110 may generate the line synchronization command from the main clock. In an aspect of the disclosure, the processor 110 implements a state machine to generate the line synchronization command. The line synchronization command may be an integral multiple of the main clock. In an aspect of the disclosure, the multiple may be randomly determined, using a random number generator. The random number may be bounded based on calibration. For example, having a delay between adjacent lines being too long will impact the performance of the image system. Similar to above, the maximum delay may be based on the application and thermal sensor array 200. For example, frame rates that are too slow may impact a mission or performance and may require image correction or compensation. The minimum delay may be based on the data rate of the system, e.g., time to bias and obtain a measurement for the row and subsequently to the processor. Additionally, the minimum delay may be based on a time need for thermal relaxation of the thermal sensor elements. The processor 110, using the random number generator, may determine the number of main clocks to wait between commands to generate and transmit the line synchronization command. In other aspects of the disclosure, the processor 110 may receive the image data for the previous row from the ROIC 250 and subsequently determine the number of main clocks to wait to generate and transmit the line synchronization command after receipt thereof.

In other aspects of the disclosure, like with the frame synchronization command(s), the imaging system 1 may include a look-up table in memory 400A. The look-up table may include lines delays 415, e.g., timing between lines. In other aspects of the disclosure, the look-up table may include the number of main clock cycles between line synchronization commands. In accordance with aspects of the disclosure, the look-up table may be populated during a calibration phase. For example, a known imaging target may be sensed by the system 1. At the same time, another imaging system may be in line of sight of the FPA 105. The delays between frames (or lines) or the timing between frame synchronization commands or the timing between line synchronization commands may be determined such that the other imaging system cannot detect the imaging system 1 at a predetermined range. In an aspect of the disclosure, timing between frames (or command(s)) may be first determined followed by the timings for the lines such that the differences in timings between lines (or command(s)) are minimized.

The processor 110, using look-up tables, may determine the number of main clocks to wait between commands to generate and transmit the frame synchronization command (s) and the line synchronization command(s). In other aspects of the disclosure, the processor 110 may receive the image data for previous line from the ROIC 250 and subsequently determine the number of main clocks to wait to generate and transmit the line synchronization command after receipt thereof.

In another aspect of the disclosure, the processor 110 may determine the timing(s) based on both a random number generator 111 (bounded as described above) and a look-up table. The look-up table may having a plurality of preset values for the number of main clocks, e.g., either number of main clocks between commands or clocks between lines, e.g., end of previous line and start of next line. In order to generate and transmit a line synchronization command, the processor 110 (via the random number generator 111) may obtain a random number and also obtain a preset value and multiple the preset value by the obtained random number. In other aspects, the random number may be used for selection of a specific value in the look-up table, e.g., line item in the table. This may eliminate a need to have a fully pre-defined look-up table with little or no randomness, which has an outer time-scale under which it begins to repeat again. This repetition may form another signature peak at a nominal location of F_frame/N for N elements in the table. In practice, this new signature can be arbitrarily low for an arbitrary length table and can be located in a portion of the spectrum where the background has a lot of power. For arbitrarily large integrations, this also results in repeatable side-lobes of the fundamental that could be used for detection or identification. A randomly accessed table avoids the appearance of the new signature elements without the need for arbitrarily long look up tables. This value may be used to determine the number of main clocks to wait either between commands or main clocks between lines, e.g., after receipt of image data of previous row.

Figure 5B:
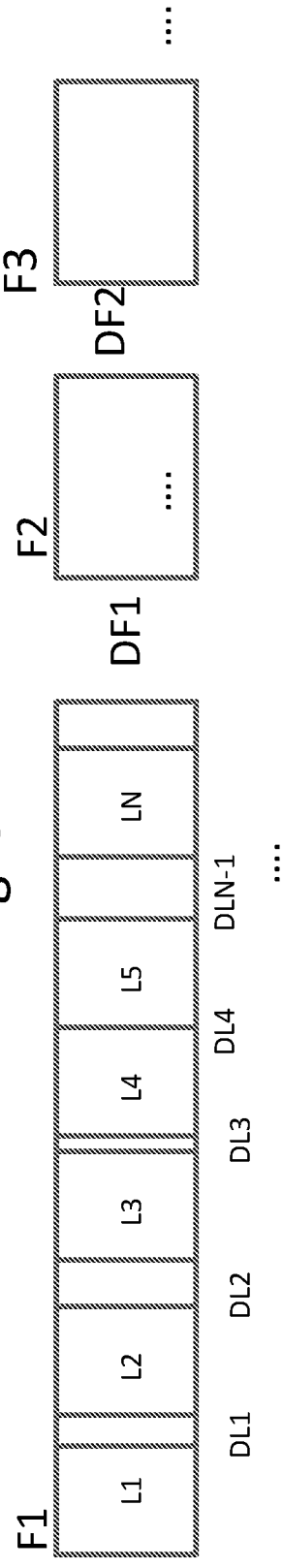
FIG. 5B depicts an example of timing between lines and frames in accordance with aspects of the disclosure.

FIG. 5B depicts an example, of the non-uniformity between frames and lines within a frame. DL1 represents the timing between the first image line (row) and the second image line (row); DL2 represents the timing between the second image line (row) and the third image line (row); DLN−1 represents the timing between the Nth−1 line (row) and the Nth line (row) (last line in the frame) in frame F1. As shown, the timing between the first/second image lines and second/third image lines (rows) are different. In an aspect of the disclosure, the timing between each line may be different. However, in other aspects, the timing between some of the lines may be the same. For example, in some aspects of the disclosure, the timing between some of the lines may be zero, e.g., no delay. In other aspects, the timing between every Nth line may be different. For example, the timing between the first through tenth lines may be the same, e.g., no delay, the timing between the tenth and the eleventh lines is delayed with respect to the others, and the timing between the eleventh and the twentieth lines may be the same, . . . . FIG. 5B also shows different timings between frames F1/F2 and F2/F3. DF1 represents the timing between Frame F1 and Frame F2 and DF2 represents the timing between Frame F2 and Frame F3.

As described above, the offset currents may be impacted by the timing between frames (non-uniform). The offset currents may also be impacted by the combination of the timing between frames and lines, e.g., non-uniform. Thus, the offset currents used when the timing between frames are different may be different than when the offset currents are used when the timing between frames and lines are different.

Therefore, in accordance with aspects of the disclosure, the thermal sensor array 200 may be calibrated in advance using a preset target pattern having a known or fixed IR signature and using various different timings between frames and lines (e.g., different combinations of timings of between frames and lines). For example, when a look-up table(s) is/are used for the timings, the calibration may include determining the offset currents for each timing (combination of frame and line timings) to be included in the look-up table(s). The offset currents may be included in a separate look-up table (separate from the look up table used to determine the timing for the frame and/or line commands). FIG. 6 depicts an example of a look up table 600 for determining the offset currents. A single look up table may be included having all of the various different timings between frames and lines, e.g., different combinations of timing, as shown. In other aspects, multiple tables may be used, each table having a specific combination of timing. In FIG. 6, the second through N columns, respectively, are the offset currents for the respective timing for each pixel. For example, for timing 1 (time 1), the offset current for the first pixel, e.g., [1,1], is O1. Pixels in the same readout row may have different offset currents. For example, pixel [1,2] for timing 1 (time 1) has an offset current of O4. The indications of offset currents in the table are for descriptive purposes only. Offset currents may be stored with units of Amps, milliamps, or microamps depending on the storage format and thermal sensor performance.

In other aspects, when a random number generated is used for the timings, the calibration may to determine the bounds, e.g., minimum and maximum. When a combination of both is used, the calibration may be used to determine the preset offset currents, which will be subsequently scaled.

The determined offset currents for the combinations are stored in memory 400A (as offset currents 410A).

In addition to the use of offset currents, imagery from a microbolometer array may also be further improved through the use of software non-uniformity correction, which corrects variations which remain after offset current subtraction. One common method is the use of gain and offset software maps. A gain and offset value is stored for each pixel. The corrected imagery is computed from the raw intensity data by multiplying the data by the gain value and adding the offset value. The offset current tables of FIG. 6 may be extended to include digital coefficients for software gain and offset correction maps for each timing.

In accordance with aspects of the disclosure, when the processor 110 determines the timings for the frame synchronization command and line synchronization in a manner as described above, the processor 110 may obtain the offset currents associated with the combination from a table of offset currents 410A (associated with the combination of timings). The processor 100 transmits the frame synchronization command, the line synchronization command and offset command, respectively via 300, 305 and the specific row and offset currents via the bit line 310.

Each for each line in the frame, a new combination of timings, e.g., frame+line, is used and thus, a different offset current may be retrieved from memory 400A (from offset currents 410A associated with the new combination of timings).

In other aspects of the disclosure, the offset currents may be determined in advance for a single combination of timings between frames and lines and stored in memory 400A (as offset currents 410A). The processor 110 in response to receiving the image data for the frame and lines may adjust the image data based on the timing of the frame synchronization command(s) and line synchronization command(s).

In other aspects of the disclosure, instead of the timings between the frames being non-uniform, uniform timings may be used for the frames with non-uniform timings between lines. The non-uniform timings between lines may be determined in any of the manners described above.

Similar to above, in an aspect of the disclosure, the offset currents for the different timing between lines may be determined during calibration and stored in a table in memory 400A (as offset currents 410A).

In an aspect of the disclosure, the processor 110 may be in the same housing as the FPA 105. In other aspects, the processor 110 may be in a different housing. In an aspect of the disclosure, the FPA 105 may be installed in a hand-held device and the display 120 mounted on a vehicle. The data is described herein as being stored in table(s). However, in other aspects of the disclosure, the data may be stored in other types of data structures. For example, the data may be described by mathematical functions may be parameterized as such rather than as lookup tables. Depending on the parameterization these functions may be polynomials, exponentials, or logarithms.

In some cases the response may be data dependent (e.g. pulse bias heating is a function of the pre-pulse temperature of the pixel). In these cases the data tables may be implemented as finite impulse response or infinite impulse response filters to capture both the self heating and data dependence.

Figure 8:
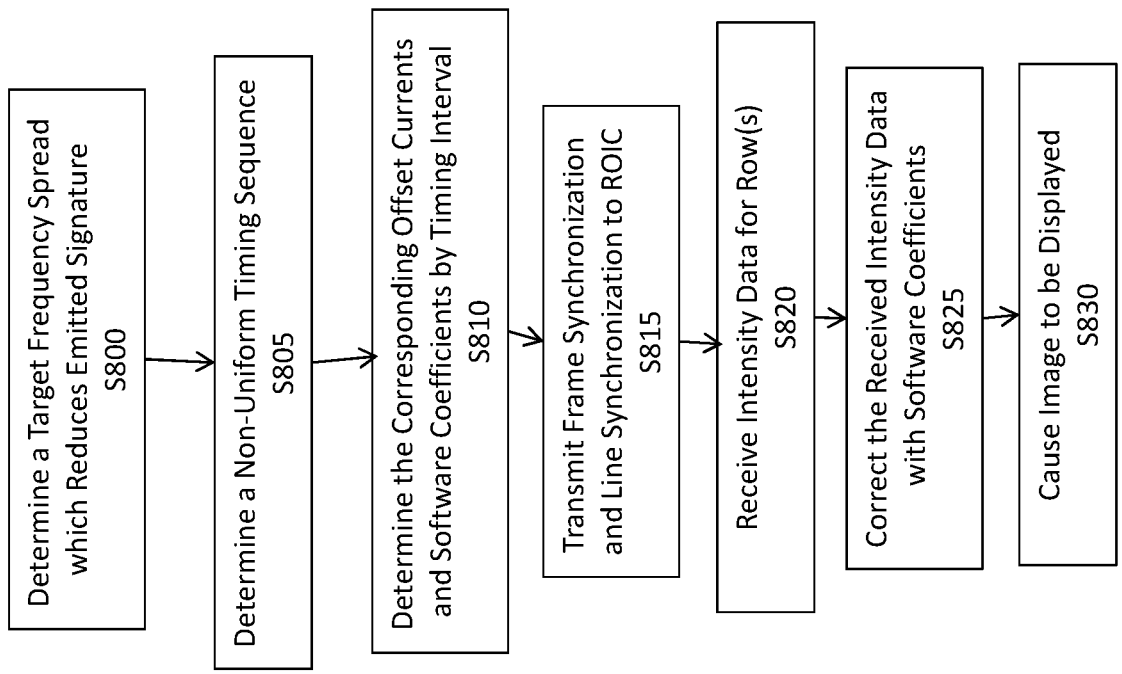
FIG. 8 depicts a flow diagram of an method in accordance with aspects of the disclosure.

FIG. 8 depicts an example of a method of controlling the ROIC 250 and generating an image for the frames in accordance with aspects of the disclosure. At S800, the processor 110 determines a target frequency spread for the frame rate. The target frequency spread is determined such that the emitted signature from the thermal sensors due to pulse biasing is reduced. In aspect of the disclosure, this determination may be based on the type of application (mission limited) and type of thermal sensors. As described above, in applications where the image is moving faster, the target frequency spread may be smaller than where the image is stable or not moving. In applications where it is important not to be detected by another system at close range, the target frequency spread may be higher.

In some aspects, the system 1 may have multiple look-up tables having different timings and the determined target frequency spread is used to select the look-up table. In other aspects, when the processor 110 uses a random number generator, the target frequency spread is used to set the bounds for the random number generator.

At S805, the processor 110 determines a non-uniform timing sequence for the frames based on the target frequency spread. For example, if the target frequency spread is +−1

Hz, at a base frame rate of 30 Hz, the available timings is shown in FIG. 7C (32.3 ms-34.6 ms). Thus, the timing between successive frames may be between 32.3 ms and 34.6 ms. The non-uniform timing sequence with the bound time may be determining using the above described look-up table 405 and/or random number generator 111.

At S810, the processor 110 determines the corresponding offset currents for the thermal sensors for the timing intervals determined in S805 per frame. In an aspect of the disclosure, at S810, the processor 110 also determines which row(s) and thermal sensors(s) that are going to be a part of the cluster in the frame. In this aspect, the processor 110 may also determine the order, e.g., row order. The corresponding offset current is determined for each thermal sensors that will be pulse biased. Once the order for the pulse biasing is set for the frame, the timing of the frame rate may be used to determine the timing of the pulse biasing of the rows. In an aspect of the disclosure, the processor 110 may retrieve the offset currents for the thermal sensors from offset current table 410 stored in memory 400. In an aspect of the disclosure, the memory 400 may store more than one offset current table 410 for a given timing between tables. The different offset current tables may be used when the order for the rows are different.

Also at S810, the processor 110 determines the corresponding software coefficients used in the image processing of the frame to display the image based on the timing interval between frames. The timing-based software coefficients include the gain and offset value described above. The gain and offset value may be stored in memory 400 in the offset current table 410 for each pixel. In other aspects, the gain and offset value may be stored in their own tables in memory 400.

At S815, the processor 110 transmits the frame synchronization to the ROIC at the determined timing interval and the line synchronization for each row that is determined to be pulse biased for the frame at the determined timing (based on the order and frame rate). The line synchronization may include the offset currents for the thermal sensors that are being concurrently pulsed bias (command line 300 and bit line 310).

At S820, the processor 110 receives the intensity data for the row(s) that are concurrently pulsed biased (frame bit 325, video 320 and source synchronization pixel clock 315). In an aspect of the disclosure, the intensity data may be sequentially received from the ROIC 250 for each sequential concurrent pulse biasing of the row(s). Similarly, in an aspect of the disclosure, the processor 110 sequentially transmits the line synchronization for the different row(s) in the frame. For example, the processor 110 may transfer the line synchronization for rows 1 and 2 and receive the intensity data for the same and then transmit the line synchronization for the next set of row(s). the intensity data may be temporarily stored in memory until the intensity data for all the rows selected for the frame are received.

At S825, the processor 110 corrects the received intensity data per pixel (thermal sensor) using the determined software coefficients in S810. The corrected imagery is computed from the raw intensity data by multiplying the data by the gain value and adding the offset value.

At S830, the processor 110 transfers the image data for the frame to a display for display.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
an oscillator configured to generate a main clock;
a focal-plane array (FPA) comprising:
  a two-dimensional configuration of thermal sensors arranged in rows and columns; and
  readout circuitry to pulse bias one or more thermal sensors in one or more of the rows and obtain output from the pulse biased thermal sensors, and
a processor configured to generate a plurality of frame synchronization signals from the main clock and transmit the plurality of frame synchronization signals to the readout circuitry, each frame synchronization signal being an instruction to start the biasing and reading for a respective frame, where the plurality of frame synchronization signals are generated such that a timing between pulse biasing of the same thermal sensor is not uniform.

2. The system of claim 1, wherein the frames comprises at least a first frame, a second frame and a third frame, wherein the timing between the first frame and the second frame is different from the timing between the second frame and the third frame.

3. The system of claim 1, further comprising a memory storing a table of delay values, the delay values being integer multiplies of the main clock, wherein the processor is configured to generate the plurality of frame synchronization signals based on the table of delay values.

4. The system of claim 1, wherein the plurality of frame synchronization signals are based on bounded pseudo random values.

5. The system of claim 3, wherein the processor is configured to generate the plurality of frame synchronization signals based on the table of delay values and scaled with bounded pseudo random values.

6. The system of claim 1, wherein the timing between frames is set based on a target frequency spread determined based on an application for the system.

7. The system of claim 1, wherein the system has an imaging range of a first distance and wherein the timing between frames is set such that the system cannot be detected by another system within a second distance, which is a percentage less than the first distance.

8. The system of claim 1, further comprising a memory storing a table of offset currents for each row based on a timing between frames, wherein the processor is further configured to determine the offset currents for rows in the frame based on the timing between frames and transmit the determined offset currents to the readout circuitry.

9. The system of claim 1, wherein in response to the reception of image data from the readout circuitry, the processor is configured to adjust the image data for display based on the timing between frames.

10. The system of claim 1, wherein the processor is further configured to generate a plurality of line synchronization signals from the main clock and transmit the plurality of line synchronization signals to the readout circuitry, each line synchronization signal being an instruction to start the biasing and reading for a respective line, where the plurality of line synchronization signals are generated such that a timing between pulse biasing of the same thermal sensor is not uniform.

11. The system of claim 10, wherein the lines comprises at least a first line, a second line and a third line, wherein the timing between the first line and the second line is different from the timing between the second line and the third line.

12. The system of claim 10, further comprising a memory storing a table of delay values, the delay values being integer multiplies of the main clock, wherein the processor is configured to generate the plurality of line synchronization signals based on the table of delay values.

13. The system of claim 10, wherein the plurality of line synchronization signals are based on bounded pseudo random values.

14. The system of claim 10, wherein the processor is configured to generate the plurality of line synchronization signals based on the table of delay values and scaled with bounded pseudo random values.

15. The system of claim 10, further comprising a memory storing a table of offset currents for each row based on a timing between frames and rows, wherein the processor is further configured to determine the offset currents for rows in the frame based on the timing between frames and rows and transmit the determined offset currents to the readout circuitry.

16. An imaging system, comprising:
an oscillator configured to generate a main clock;
a focal-plane array (FPA) comprising:
  a two-dimensional configuration of thermal sensors arranged in rows and columns; and
  readout circuitry to pulse bias one or more thermal sensors of one or more of the rows and obtain output from the pulsed biased thermal sensors, and
a processor configured to generate a plurality of line synchronization signals from the main clock and transmit the plurality of line synchronization signals to the readout circuitry, each line synchronization signal being an instruction to start the biasing and reading for a respective line, where the plurality of line synchronization signals are generated such that a timing between pulse biasing of the same thermal sensor is not uniform.

17. A method comprising:
determining a non-uniform timing sequence between a plurality of frames of an image such that a pulse biasing of a same thermal sensor of a two-dimensional configuration of thermal sensors arranged in rows and columns is not uniform;
transmitting a plurality of frame synchronization signals to readout circuitry, the readout circuitry configured to pulse bias one or more thermal sensors of one or more of the rows and obtain output from the pulsed biased thermal, each frame synchronization signal being an instruction to start the biasing and reading for a respective frame.

18. The method of claim 17, further comprising determining the offset currents for the pulse biased thermal sensors based on the non-uniform timing sequence and transmitting the offset currents for the pulse biased thermal sensors to the readout circuitry.

19. The method of claim 17, further comprising receiving intensity data corresponding to the pulsed biased thermal sensors and correcting the received intensity data using coefficients determined based on the non-uniform timing sequence.

* * * * *